United States Patent
Krouse

(10) Patent No.: US 6,955,049 B2
(45) Date of Patent: Oct. 18, 2005

(54) MACHINE AND SYSTEM FOR POWER GENERATION THROUGH MOVEMENT OF WATER

(76) Inventor: Wayne F. Krouse, 5350 McCulloch Cir., Houston, TX (US) 77056

(*) Notice: Subject to any disclaimer, the term of this patent is extended or adjusted under 35 U.S.C. 154(b) by 50 days.

(21) Appl. No.: 10/851,604

(22) Filed: May 21, 2004

(65) Prior Publication Data
US 2004/0250537 A1 Dec. 16, 2004

Related U.S. Application Data

(60) Provisional application No. 60/474,051, filed on May 29, 2003.

(51) Int. Cl.[7] .......................... F03B 13/00; F03B 13/10; F03B 13/12; H02P 9/04
(52) U.S. Cl. ....................... 60/641.7; 60/398; 290/43; 290/54; 415/3.1; 415/7; 415/906; 416/DIG. 4
(58) Field of Search ................... 60/398, 641.7, 60/495; 290/42, 43, 53, 54; 415/3.1, 7, 906; 416/DIG. 4

(56) References Cited

U.S. PATENT DOCUMENTS

| | | |
|---|---|---|
| 1,312,021 A | 8/1919 | Dickinson et al. |
| 3,986,787 A | 10/1976 | Mouton, Jr. et al. |
| 4,034,231 A | 7/1977 | Conn et al. |
| 4,039,847 A | 8/1977 | Diggs |
| 4,079,264 A | 3/1978 | Cohen |
| 4,095,918 A | 6/1978 | Mouton, Jr. et al. |
| 4,163,904 A | 8/1979 | Skendrovic |
| 4,204,799 A | 5/1980 | de Geus |
| 4,324,984 A | 4/1982 | Borgren |
| 4,363,564 A * | 12/1982 | Borgren .................. 290/53 |
| 4,383,182 A | 5/1983 | Bowley |
| 4,422,820 A | 12/1983 | Kirsch et al. |
| 4,424,451 A | 1/1984 | Schmidt |
| 4,448,020 A | 5/1984 | Wood et al. |
| 4,468,153 A | 8/1984 | Gutierrez |
| 4,516,907 A | 5/1985 | Edwards |
| 4,524,285 A | 6/1985 | Rauch |
| 4,545,726 A | 10/1985 | Holliger |
| 4,600,360 A | 7/1986 | Quarterman |
| 4,603,551 A | 8/1986 | Wood |
| 4,686,376 A | 8/1987 | Retz |
| 4,742,241 A | 5/1988 | Melvin |
| 4,789,302 A | 12/1988 | Gruzling |
| 4,816,697 A | 3/1989 | Nalbandyan et al. |
| 4,868,408 A | 9/1989 | Hesh |
| 5,040,945 A | 8/1991 | Levesque |
| 5,136,173 A | 8/1992 | Rynne |
| 5,440,176 A | 8/1995 | Haining |
| 5,592,816 A | 1/1997 | Williams |
| 5,611,668 A | 3/1997 | Yapp et al. |
| 6,091,161 A | 7/2000 | Dehlsen et al. |
| 6,139,255 A | 10/2000 | Vauthier |
| 6,168,373 B1 | 1/2001 | Vauthier |

(Continued)

FOREIGN PATENT DOCUMENTS

| | | | |
|---|---|---|---|
| DE | 19504356 | 8/1996 | |
| GB | 2 074 795 | 11/1981 | |
| GB | 2314124 | 12/1997 | |
| WO | WO 02/090768 | 11/2002 | |
| WO | WO 03029645 A1 * | 4/2003 | ............ F03B/13/10 |

Primary Examiner—Sheldon J Richter

(57) ABSTRACT

A machine and system for power generation through movement of water having an array of power generating cells electrically interconnected, where the array is configured in an interchangeable modular fashion and the cells are positioned to receive kinetic energy from the movement of water to generate electricity through the movement of an electrical turbine within each cell. The individual turbines and cells may generate relatively small amounts of electricity and use polymer magnetics in the impellers and windings in the turbine to withstand ocean environments and are stacked on electrically conductive trays for ease of installation and replacement.

14 Claims, 9 Drawing Sheets

U.S. PATENT DOCUMENTS

| | | |
|---|---|---|
| 6,246,125 B1 | 6/2001 | Axtell |
| 6,247,308 B1 | 6/2001 | Solell |
| 6,310,406 B1 | 10/2001 | Van Berkel |
| 6,406,251 B1 * | 6/2002 | Vauthier .................. 415/7 |
| 6,417,578 B1 | 7/2002 | Chapman et al. |
| 6,472,768 B1 | 10/2002 | Salls |
| 6,531,788 B2 | 3/2003 | Robson |
| 6,856,036 B2 * | 2/2005 | Belinsky .................. 290/54 |
| 2002/0011757 A1 | 1/2002 | Tanaka et al. |
| 2003/0025334 A1 | 2/2003 | McDavid |
| 2003/0052487 A1 | 3/2003 | Weingarten |
| 2004/0189010 A1 * | 9/2004 | Tharp .................. 290/54 |

* cited by examiner

MACHINE AND SYSTEM FOR POWER GENERATION THROUGH MOVEMENT OF WATER

CROSS REFERENCE TO RELATED APPLICATIONS

The present application is related to the following U.S. patent application: provisional patent application No. 60/474,051 titled "A Machine for Power Generation through Movement of Water," filed on May 29, 2003, which is hereby incorporated by reference as if fully set forth herein.

FIELD OF INVENTION

This invention relates generally to the field of power generation and more specifically to a machine and system for power generation through movement of water.

BACKGROUND OF THE INVENTION

Extraction of energy from water sources has been a desire of mankind for ages. Various methods involve water wheels, entrainment, and hydroelectric turbines. Prior attempts to convert ocean tidal movements or current into power involve large scale systems, the use of traditional generators and various turbines to capture the power of the water.

The deficiency in the prior art is that the systems are not easily configurable for different settings, require large scale construction and are not commercially viable. They are not suitable to being moved easily, they are not topographically adaptable, nor do they withstand the corrosive effects of water. Further, the weight needed for a traditional generator having magnets and copper wire inhibits replacement. Moreover, there has been no system using an array of small power cells arranged in parallel to capture the movement of the ocean, rivers or other current in such a way as to combine relatively small generators into one large power production system.

BRIEF SUMMARY OF THE INVENTION

A water driven turbine is used to extract electrical energy from the moving water (wave, current, tidal or other). A turbine fan will rotate independently in a converging nozzle to extract additional energy from moving water after each independent turbine fan. The fan blades rotate independently inside of a housing. The housing contains windings made of copper or a conductive polymer or other conductive material. Rotating magnetic field produced from a magneto polymer, particulate materials that generate a magnetic field suspended in a homogeneous or heterogeneous polymer or traditional magnetic material such as Fe, Co Ni, Gd, Sn, Nd or ceramics that exhibit magnetic fields generates electrical energy as the independent turbine containing the magnetic material passes by the conductive windings. The magneto polymer differs in that the magnetic characteristic exists at the atomic level as opposed to a particulate mixture suspended in a polymer. The truss structure in the polymer housing is composed of polymer or fiberglass reinforced polymer, carbon composite or nanotube reinforced polymer. The truss structure supports the central shaft of the turbine blade assembly inside of the polymer turbine housing. Electrical energy that is generated in each turbine should be in the range of 0.001–5,000 watts (W) but could be as large as 100,000 W per turbine. The electrical energy is transferred from the winding of each turbine and connected in parallel to a power transfer conduit internal to each of the turbine housings composed of copper wire or electrically conductive polymer. The power is transferred from one turbine housing to the next via the internal conduit until it can be transferred to a collection system for metering and eventual transfer to the grid. If one generator generates between 0.001–100,000 W, then a plurality of generators connected in parallel in a two dimensional array has the potential to generate commercial quantities in the multiple megawatt (MW) range. Since this system is made of polymer, ceramic or nonferrous coated metal, and any potentially magnetic part internal to the turbine does not contact the water directly, it does not corrode, it is light weight, it is portable, it is cheap to manufacture and replace and topographically configurable. Additionally, the array's modular (cellular) design allows for repairs and maintenance of the turbines without taking the entire power generating capacity of the array offline. Realistically, only a fractional amount of power generating capacity would be taken offline at any one time as only individual vertical stacks in the two dimensional array would be taken offline for maintenance of a turbine in that stack.

In accordance with a preferred embodiment of the invention, there is disclosed a machine for power generation through movement of water having an array of power generating cells electrically interconnected, where the array is composed of cells in a interchangeable modular arrangement and the cells are positioned to receive kinetic energy from the movement of water, wherein the cells convert energy by the movement of an electrical turbine within each cell.

In accordance with another preferred embodiment of the invention, there is disclosed a machine for power generation through movement of water having a housing with electrically conductive windings, an impeller displaced within the housing having polymer magnetic elements that create induced electrical energy upon rotation of the impeller within the housing, and blades on the impeller for receiving kinetic energy from water wherein the impeller is motivated by the movement of water across the blades.

In accordance with another preferred embodiment of the invention, there is disclosed a system for power generation through movement of water having a plurality of turbines with magnetic polymer displaced in an impeller of a the turbines, where the impellers are surrounded by electrically conductive windings displaced in a housing about the impellers, the turbines are arrayed in a modular arrangement and electrically interconnected where the impellers are motivated by the movement of water to generate electricity.

In accordance with another preferred embodiment of the invention, there is disclosed a system for power generation through the movement of water having a plurality of energy cells, each cell individually producing less than 5000 Watts each, a tray for holding said cells in electrical communication through an electrical conduit internal to the polymer with one or more of the cells, the cells are arranged in vertically stacked arrays in the ocean and transverse to the ocean tidal movement, and the arrays are electrically connected to the electrical grid.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a representative basis for teaching one skilled in the art to employ the present invention in virtually any appropriately detailed system, structure or manner.

Figure 1:
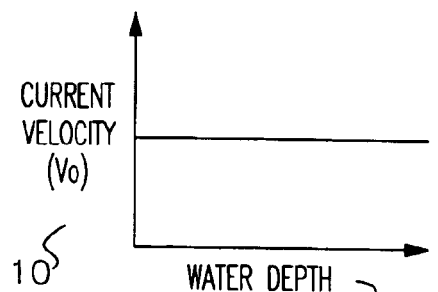
FIG. 1 is a graph illustrating average current velocity as a function of water depth in an ocean deepwater zone.

Turning now to FIG. 1, there is shown a graph depicting average or mean current velocity 10 as a function of water depth 12 in the ocean deepwater zone. It is observed that velocity is relatively constant in deepwater zones, between some upper and lower limits, and for certain purposes may be a source of water energy applicable to the present invention. The Gulf Stream in the Atlantic Ocean and Kuroshio Current in the Pacific Ocean provide examples of steady deepwater current that the present invention could utilize to drive a plurality of cells arrayed as further described herein. However, in a deepwater zone, it is difficult to harness the water power and maintain an array of power generating units. In contrast, the water movement in a breakwater zone, a non electrified reservoir, a river or aqueduct are more amenable to the advantages and benefits of the current invention.

Figure 2:
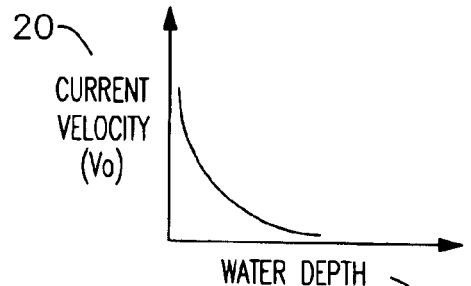
FIG. 2 is a graph illustrating water velocity as a function of water depth in an ocean breakwater zone.

FIG. 2 shows a graph depicting water velocity 20 as a function of water depth 22 in an ocean's breakwater zone. It is observed that as water depth decreases, i.e. as the wave approaches the shore, the velocity of the water increases to dissipate the energy contained in the wave. This provides a ready and renewable source of energy for an array of cells of the type described herein. As will be more fully appreciated below, the presence of shoreline energy capturing systems as shown herein, benefit from this phenomenon to create cheap and reliable energy. This method will work for any accessible moving body of water with fairly constant velocity for a given cross sectional area.

Figure 3:
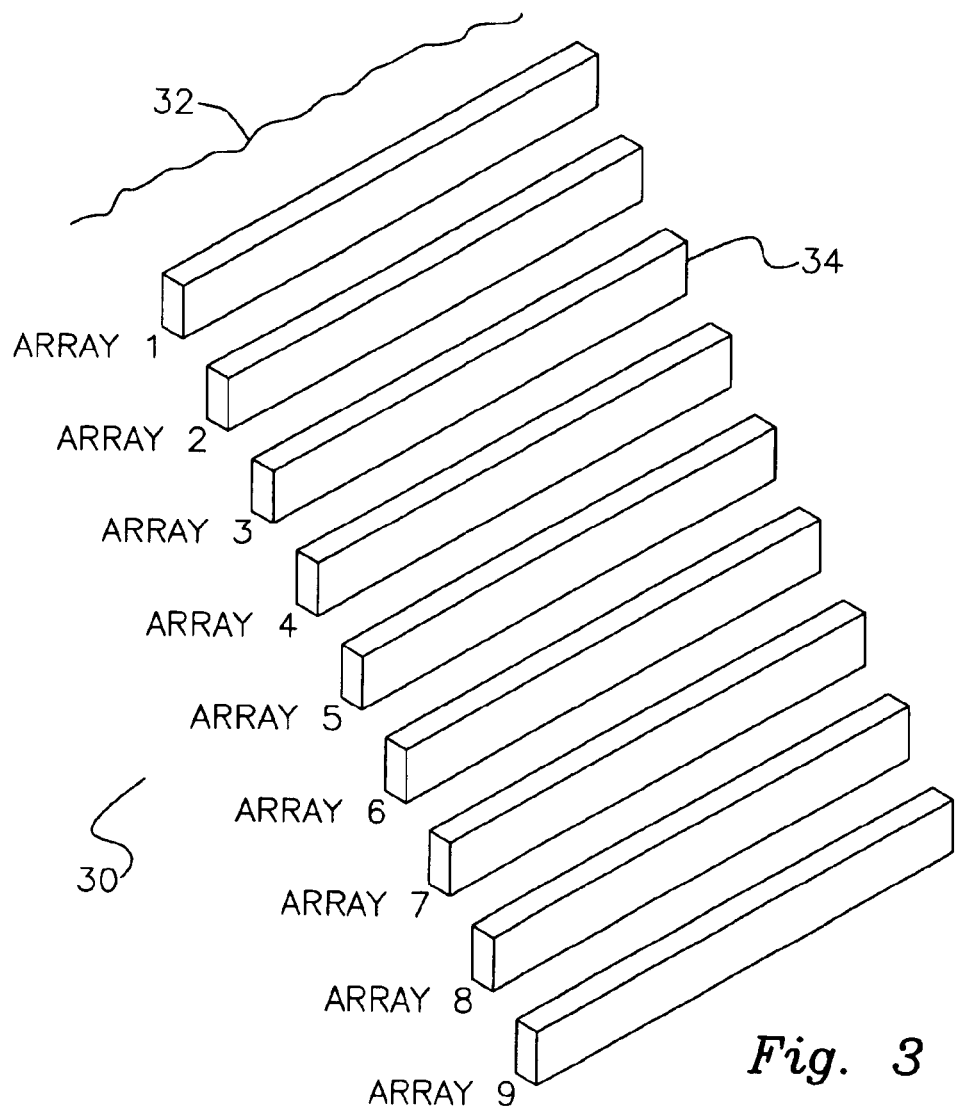
FIG. 3 is a schematic diagram illustrating an array of power cells for a commercial scale generation site.

FIG. 3 shows an array set 30 that are aligned in a preferred embodiment of the present invention. Array set 30 is comprised of a series of individual arrays 34, which are deployed in the breakwater zone parallel to a beach 32 in an ocean's breakwater zone to receive the movement of tidal water. Such arrays could be aligned transverse to the flow of a river to take advantage of the prevailing current, in a deepwater zone that might benefit from a current movement or in other locations to take advantage of localized current. Each array 34 is a series of stacked energy cells that are driven individually by the movement of water through energy cells that are stacked together in some fashion. The cells are interconnected through an electricity connection tray (see FIG. 8) so that each array set 30 generates a summing of electrical energy from the energy cells. The array set 30 is then eventually connected to the power grid.

Figure 4:
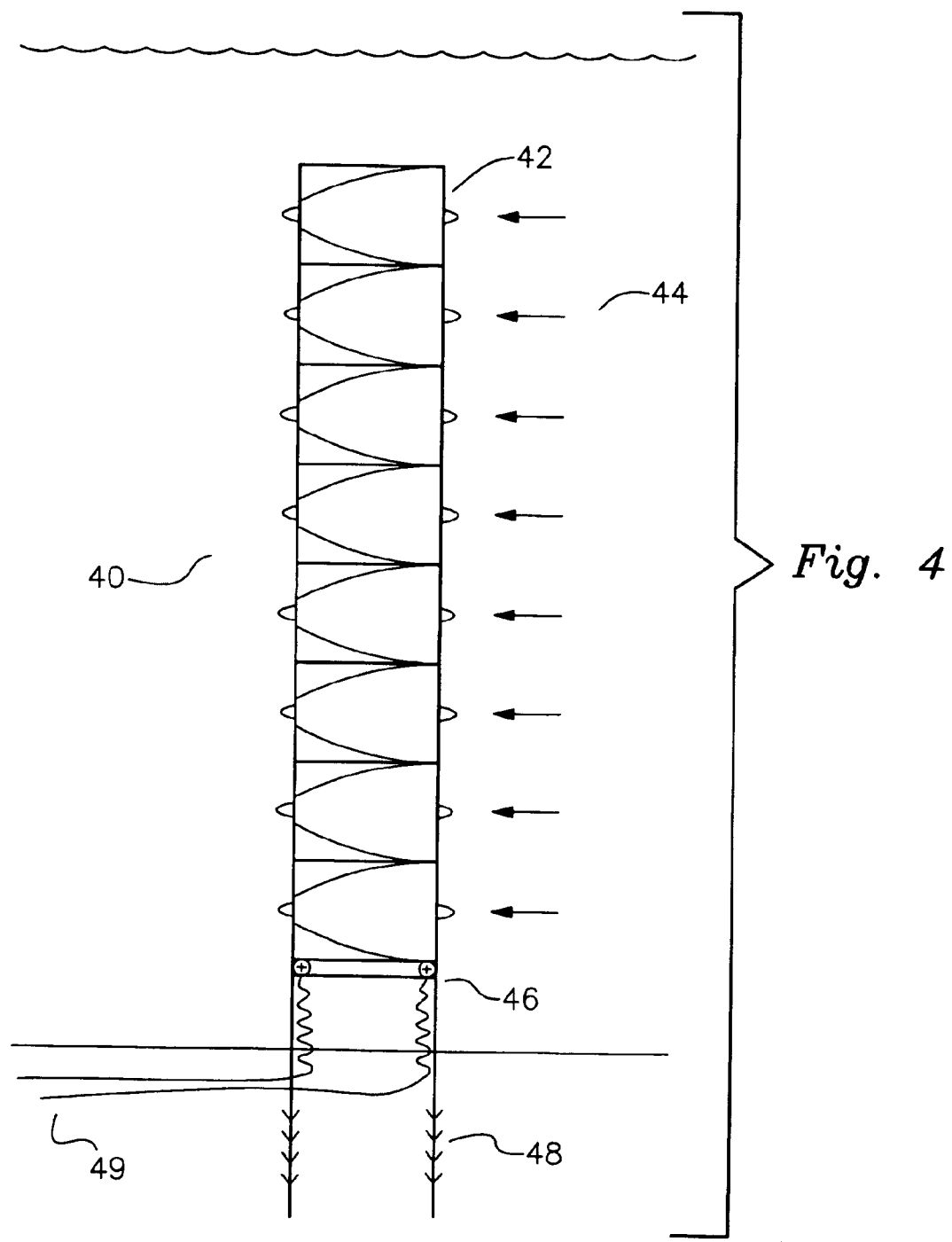
FIG. 4 is a schematic diagram illustrating a vertical stack of cells in a portion of an array oriented for uni-directional flow in a deepwater zone.

FIG. 4 shows a side view of a single stack 40 of energy cells 42 in a larger array as depicted in FIG. 3. FIG. 4 shows a single stack 40 of energy cells 42 for reception of unidirectional water flow in a deepwater zone or river, or even a breakwater zone. As water flows across the energy cells shown by left pointing arrows 44, energy cells 42 receive kinetic energy which in turn generates power. The individual energy cells 42 are stacked and electrically interconnected at positive and negative poles 46 to generate power that is transmitted over lines 49 to an inverter or the power grid. Each individual energy cell 42 may produce a small amount of energy but stacks 40 of energy cells 42 connected in parallel produce substantial energy. Stack 40 may be moored at anchor 48 in the ocean floor by conventional means well known in the art. The arrays thus arranged are flexible and float in the water while at the same time presenting themselves transverse to the water flow for maximum power generation.

A significant advantage of the modularization of the power array is the use of small power devices which in a preferred embodiment may have power outputs on the order of 0.001–5000 W. This permits the use of devices that may be significantly smaller than typical power generating turbines on the scale of 0.001 in 3 to 50,000 in$^3$.

By using such small devices, the creation of a large array is greatly facilitated and permits the ready exchange of non-functioning devices without affecting the power generation for any period of time. Such miniaturization of the power generating devices may be termed a micro-generator or micro-device. The combination of a multiple devices into an array has an output when summed that is equal to a much larger single generator.

Figure 5:
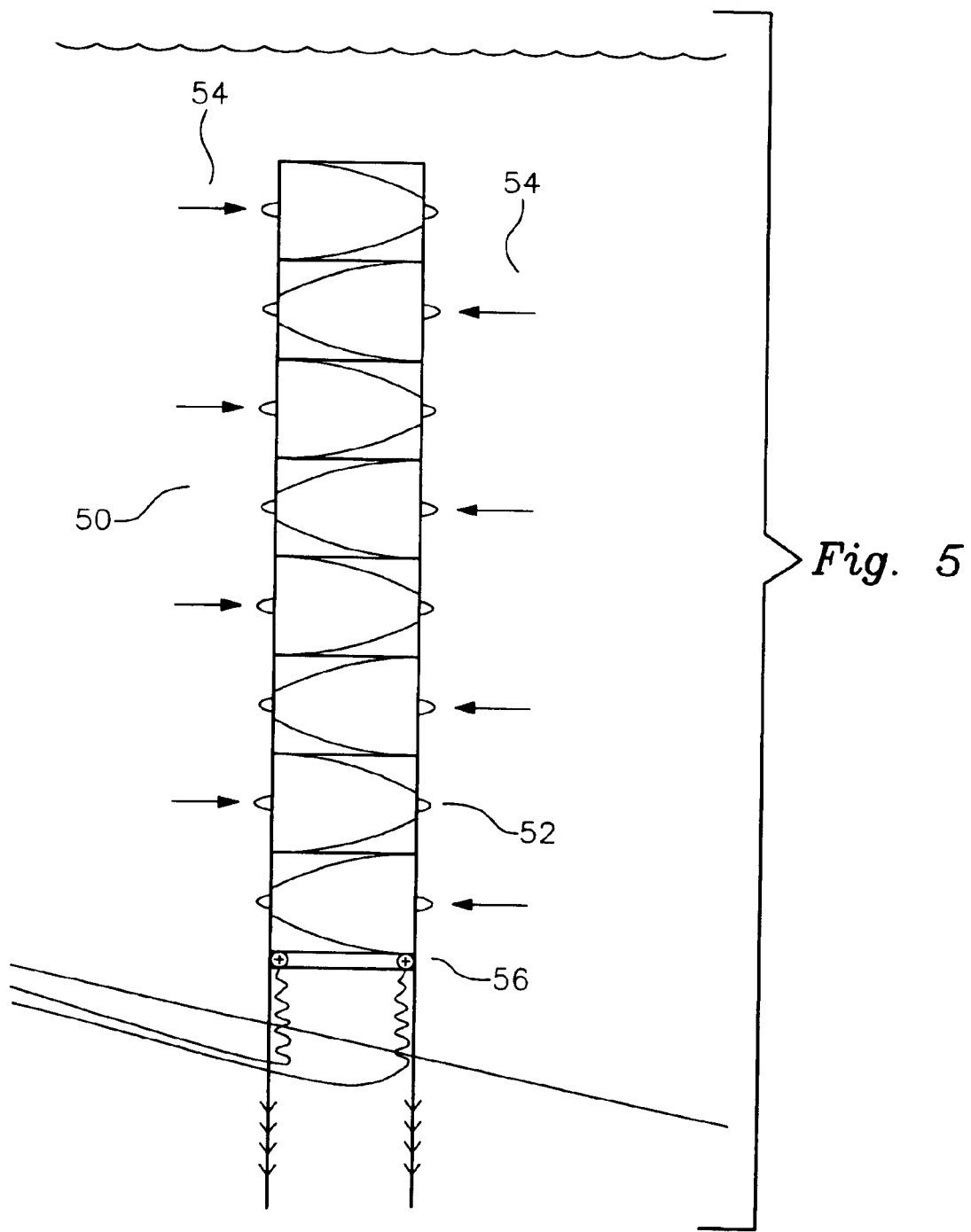
FIG. 5 is a schematic diagram illustrating a vertical stack of cells in a portion of an array oriented for bi-directional flow in a deepwater zone.

FIG. 5 shows a single stack 50 of energy cells 52 for maximum reception of the bi-directional water flow in a breakwater zone. As water flows across the energy cells 52 shown by the left and right pointing arrows 54, energy cells 52 receive kinetic energy which in turn generates power. Water flow may be through tidal action having the ebb and flow in two directions thereby activating cells designed and positioned to benefit from both directions of water movement. FIG. 5 shows a side view of one stack 50 of cells 52 in a larger array as depicted in FIG. 3 with the cells electrically interconnected by positive and negative poles 56 in similar fashion as described in FIG. 4.

Figure 6:
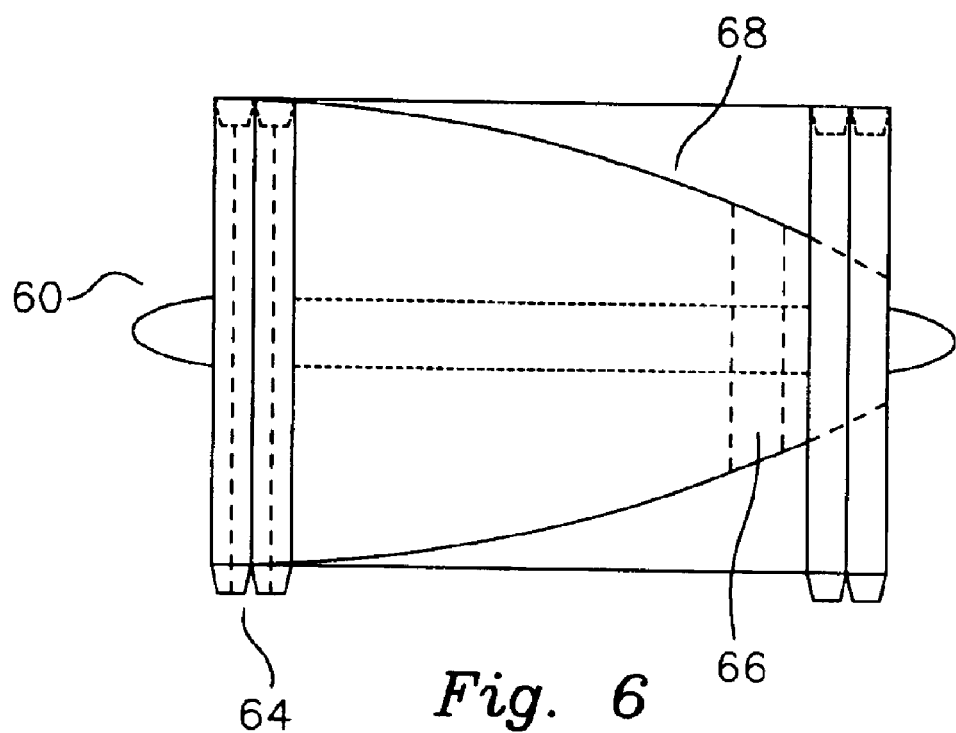
FIG. 6 is a side elevational view of a conical impeller having a plurality of fan blades in a single stage set in a housing for electrical connection in an array.

FIG. 6 show a side view of a single cell impeller 60 having a plurality of fins (see FIG. 7) for converting kinetic energy into electrical energy. The individual cell is configured for electrical connections 64 to other cells in parallel fashion creating a cumulative power generation. The impeller 60 (or turbine) is situated in a housing that is properly configured to generate electricity. The housing has a cross brace (depicted in FIG. 7) for added stability. The generator is created by having magnets or magnetic material positioned in the housing for the blades and positioning windings in the housing surrounding the impeller 60. As the impeller 60 is turned by the action of the water, an electromagnetic force is created imparting current on the windings and in turn generating electricity. By configuring the cells in parallel electrical connections, the small amount of energy generated by an individual cell are added together to produce a larger amount of electrical energy.

In a preferred embodiment using conventional polymer fabrication means well known in the art, turbines and housings may be manufactured where magnetic polymers or magneto polymers are used to replace standard magnets and copper windings. The amount of magnetic polymer or magneto polymer used and its proper location are a function of the degree of magnetic attraction desired for the particular application. Magnetic forces and conductivity sufficient to generate the wattages desired herein are achievable using such materials and result in a generator that is lightweight and impermeable to the corrosive forces of water.

A single turbine may be fitted with independent blade rings 66 to allow extraction of maximum work along the longitudinal axis and the turbine may be tapered along its outer circumference 68 to increase velocity of flow due to the constricting of the nozzle in the turbine.

Figure 7:
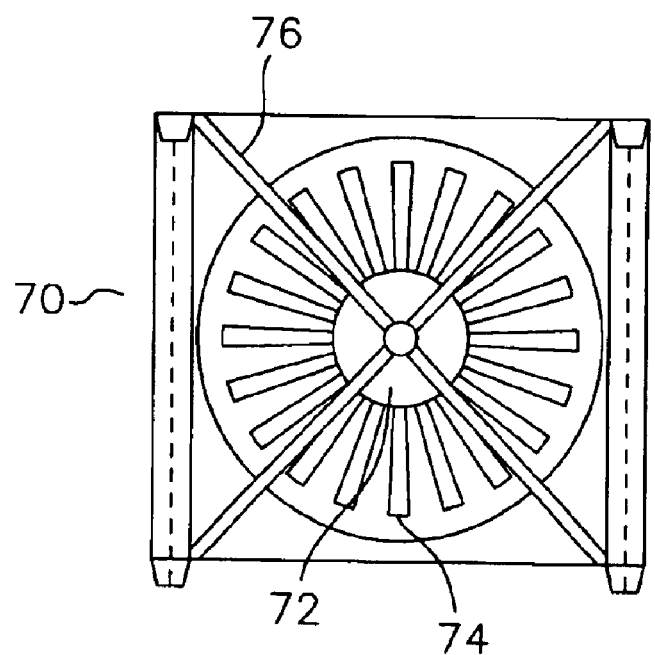
FIG. 7 is a front end elevational view of an impeller with a plurality of blades.

FIG. 7 shows an end view of a single turbine housing 70 and impeller 72 with a plurality of fan blades 74, beneficial for capturing the maximum amount of energy from the movement of water. Cross brace 76 provides added stability.

Figure 8:
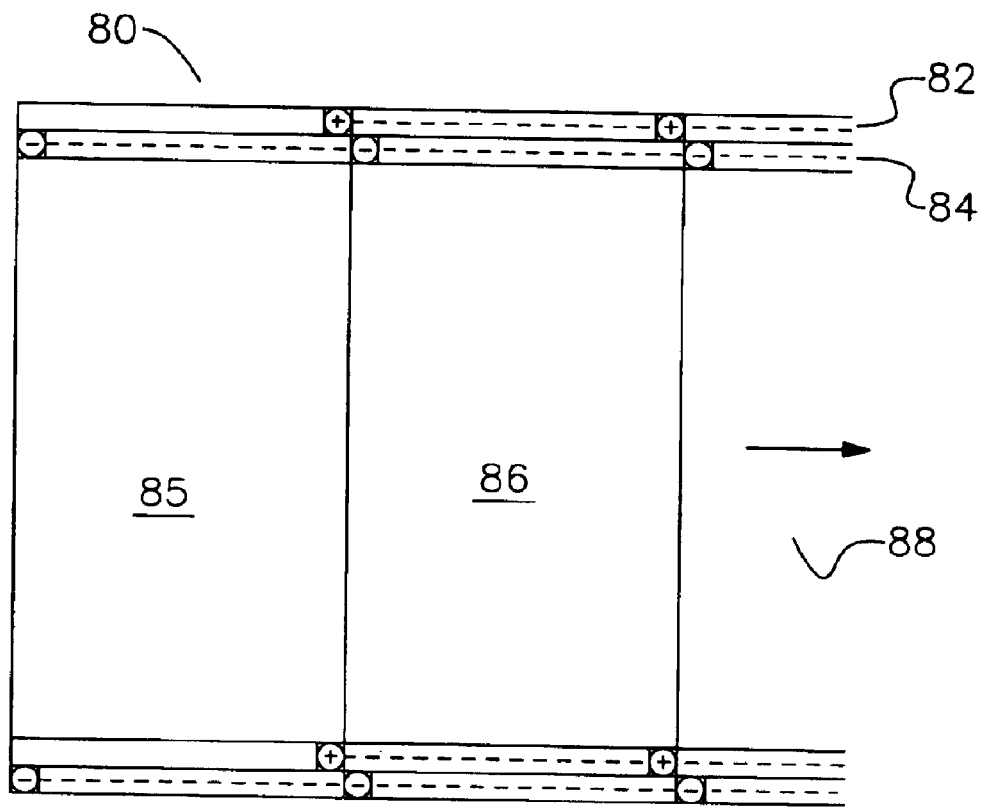
FIG. 8 is a schematic diagram illustrating an electricity connection tray for electrically mounting stacks of cells.

FIG. 8 shows an electricity connection tray 80 for affixing multiple cell stacks to create the larger arrays shown in FIG. 3. Tray 80 has electrical post channels positive 82 and negative 84 for making electrical connection to the stack of cells. Each group of vertically stacked cells is placed on a tray. First vertical stack 85, Second vertical stack 86 and N vertical stack 88 is placed one next to the other in electrical parallel connections 82 and 84 and in turn, the adjoining stacks of cells are electrically interconnected through the stacking base. As can readily be seen, tray 80 may accommodate a plurality of vertical stacks all electrically interconnected. Thus, any number of vertical stacks may be arrayed in this fashion and each stack may be of any of a number of cells as desired for the particular application. Such a polymer transfer plate may be mounted on the top of a plurality of cells for additional stacking, to provide electrical interconnection and thus permit transfer of power from an array to a rectifier/inverter and then to a grid. This arrangement permits ready installation and ease of repair.

Figure 9A:
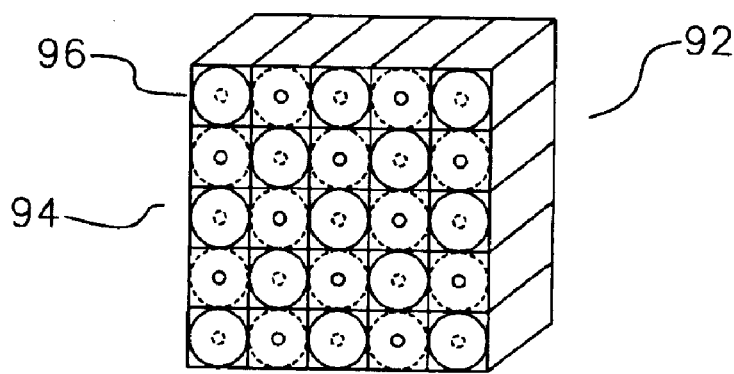
FIG. 9A is a schematic diagram illustrating an array of bi-directional cells oriented orthogonally to the flow of ocean water.

FIG. 9A shows a perspective view of cell array 92 having a plurality of cells aligned to either to receive the flow of water from the ocean side 94 or to receive the flow of water from the beach side 95. By arranging the cells in this fashion, individual cells are positioned to maximally convert the kinetic energy from the ebb and flow of the water. In this embodiment a particular cell is aligned either in one direction or the other and its power generating turbine spins optimally when receiving the direction of flow for which it was designed.

Figure 9B:
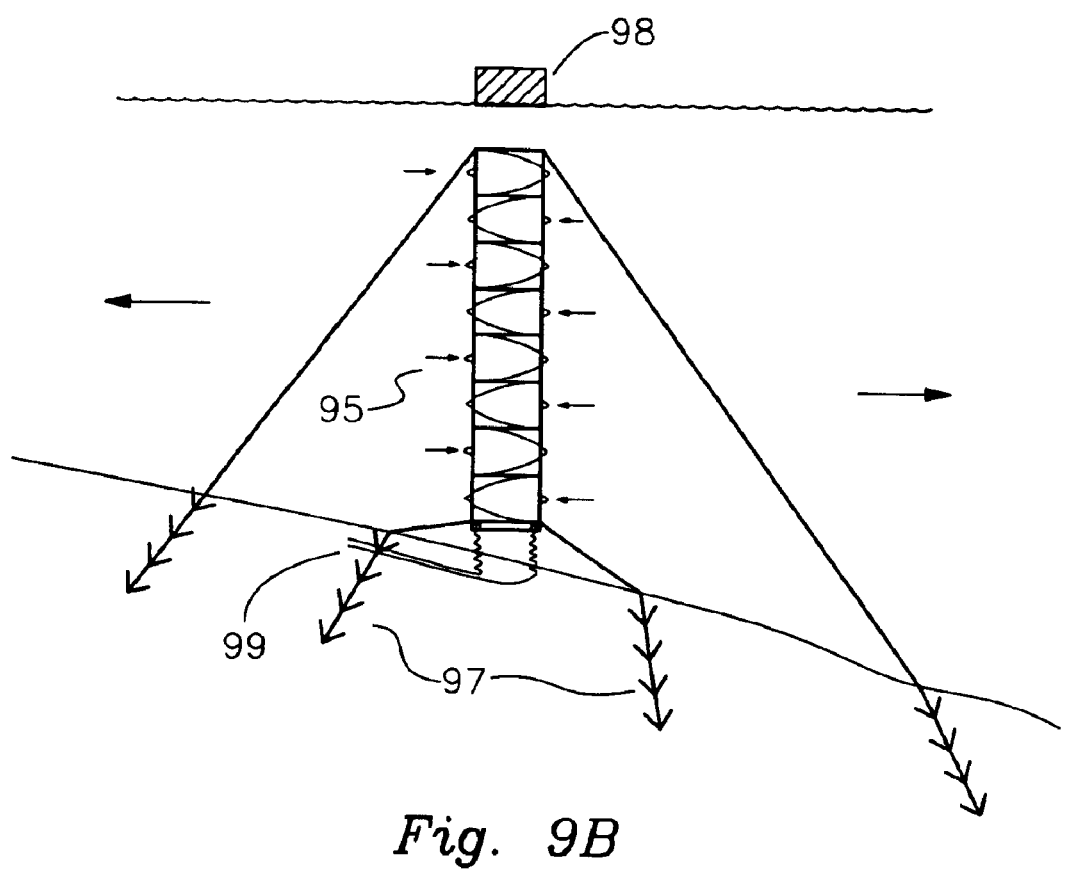
FIG. 9B is a schematic diagram illustrating an array of bi-directional cells with anchors and flotation marker and electrical connections.

FIG. 9B shows a side view of an overall arrangement of cells for receiving bi-directional flow in a stack of cells that are electrically interconnected as herein described. The stacks are preferably mounted on sturdy but lightweight housings 95 to resist the flow of ocean water and maintain stability in inclement weather. The array of cells may be affixed to the ocean floor by anchor 97 to provide greater stability. A floatation device 98 may be employed for orientation and location purposes. The cells are preferably mounted on stack trays to create an array and then are electrically summed through the operation of the electrical connection to generate power which is transmitted onward. The accumulated energy produced from the array of cells may be conveyed through conventional wire 99 means to a grid, through superconducting cable, or other electrical conveyance means well known in the art.

Figure 10A:
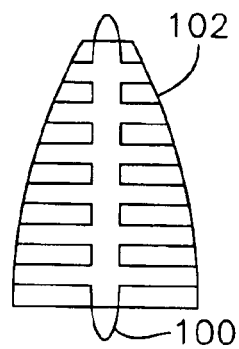
FIGS. 10A through 10D show several views of a conical turbine generator and an electricity collection tray for creating an array of cells.
Figure 10B:
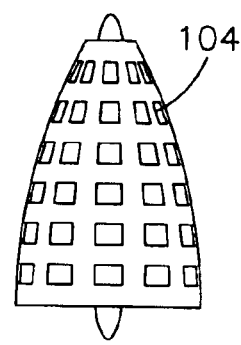
Figure 10C:
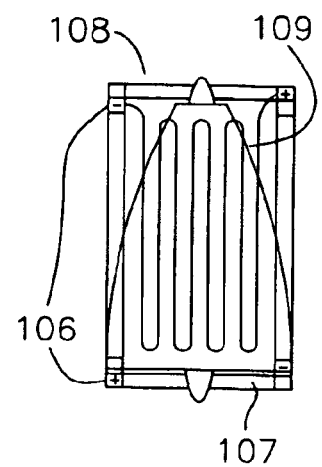
Figure 10D:
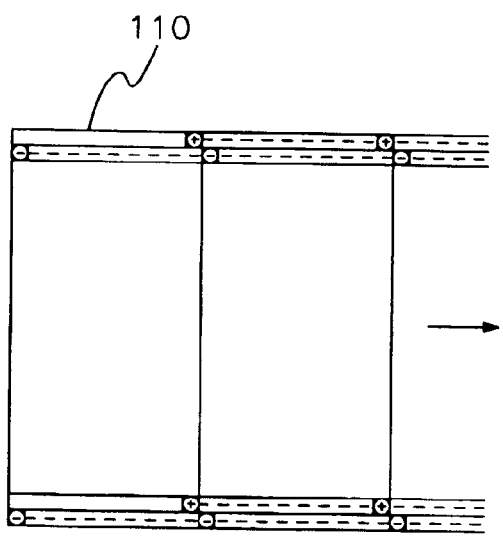

FIGS. 10A, 10B, 10C and 10D show views of a conical turbine generator having central shaft 100 and disposed about the shaft are a plurality of impeller blades in multiple stages such as stage 102. In certain embodiments, it may be preferable to have a single stage. The impeller housing has magnets 104 inserted therein or magnetic polymer imbedded in the housing. The exterior housing 108 of the turbine has terminal pass through electrical connectors 106 and a rigid support 107, which allows for stacking of individual units. FIG. 10D also shows an electricity collection tray 111 for creating an array of cells. The tray has electrical connections through copper wire or conductive polymer 109.

An innovative construction of the turbines is achieved by the use of polymers for use in polymer molds for mass production of each individual turbine. The magnetic elements of the turbine will have embedded in the turbine one of a variety of materials among them ferrous, ceramic, or magnetic polymer (magneto polymer rare earth magnets (NdFeB) types. The use of electrically conductive polymer for cathode and anode within embedded transmission system in device and device array reduces weight and makes the manufacture of small turbines efficient and economical. Further, the use of such turbines will create zero production of $CO_2$, CO, NOx, SOx, or ozone precursors during power generation. The impeller design shown in FIG. 10 is engineered in polymer to extract maximum work in tandem use with a converging housing or nozzle.

Figure 11A:
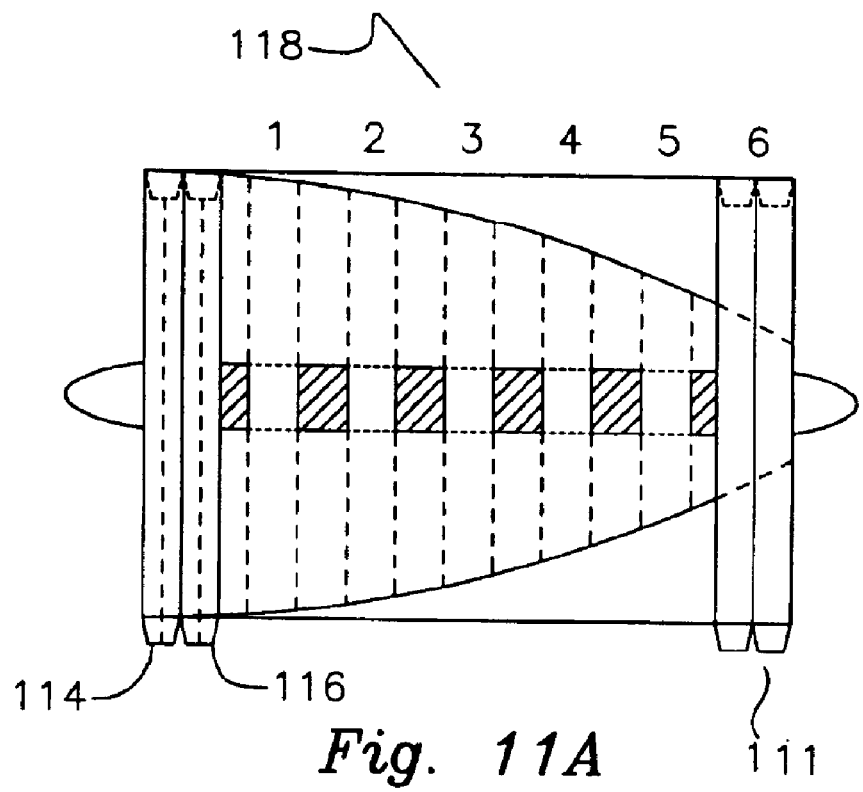
FIGS. 11A and 11B show a side and front/back view of a turbine generator having a plurality of impellers.
Figure 11B:
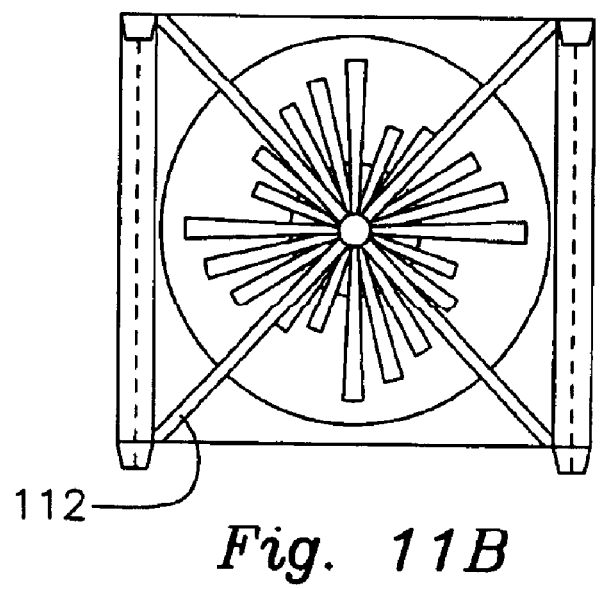

Use of polymers for corrosion resistance, low cost manufacturing, mass production and use of polymers for impeller blades or for multiple but independent impellers. The use of polymers for use in polymer molds for mass production and the use of the following magnet types in a polymer generator for use in generating power from the ocean: ferrous, ceramic, magnetic polymer (magneto polymer rare earth magnets (NdFeB) types. Further the use of electrically conductive polymer for cathode and anode within embedded transmission system in device and device array;

FIGS. 11A and 11B show a side and front/back view of a turbine generator having a plurality of impellers in several stages. In certain embodiments, it may be preferable to have a single stage to extract energy. The turbine is housed in an electrically interconnectable base 111 to allow for stacking of multiple cells in a vertical fashion and as part of a larger array. The cross brace 112 provides added support. Copper wire windings or conductive polymer windings would be configured about the impeller to produce current when magnets or magnetic material imbedded in the impeller housing spin with the turbine impeller producing magnetic flux.

Figure 12:
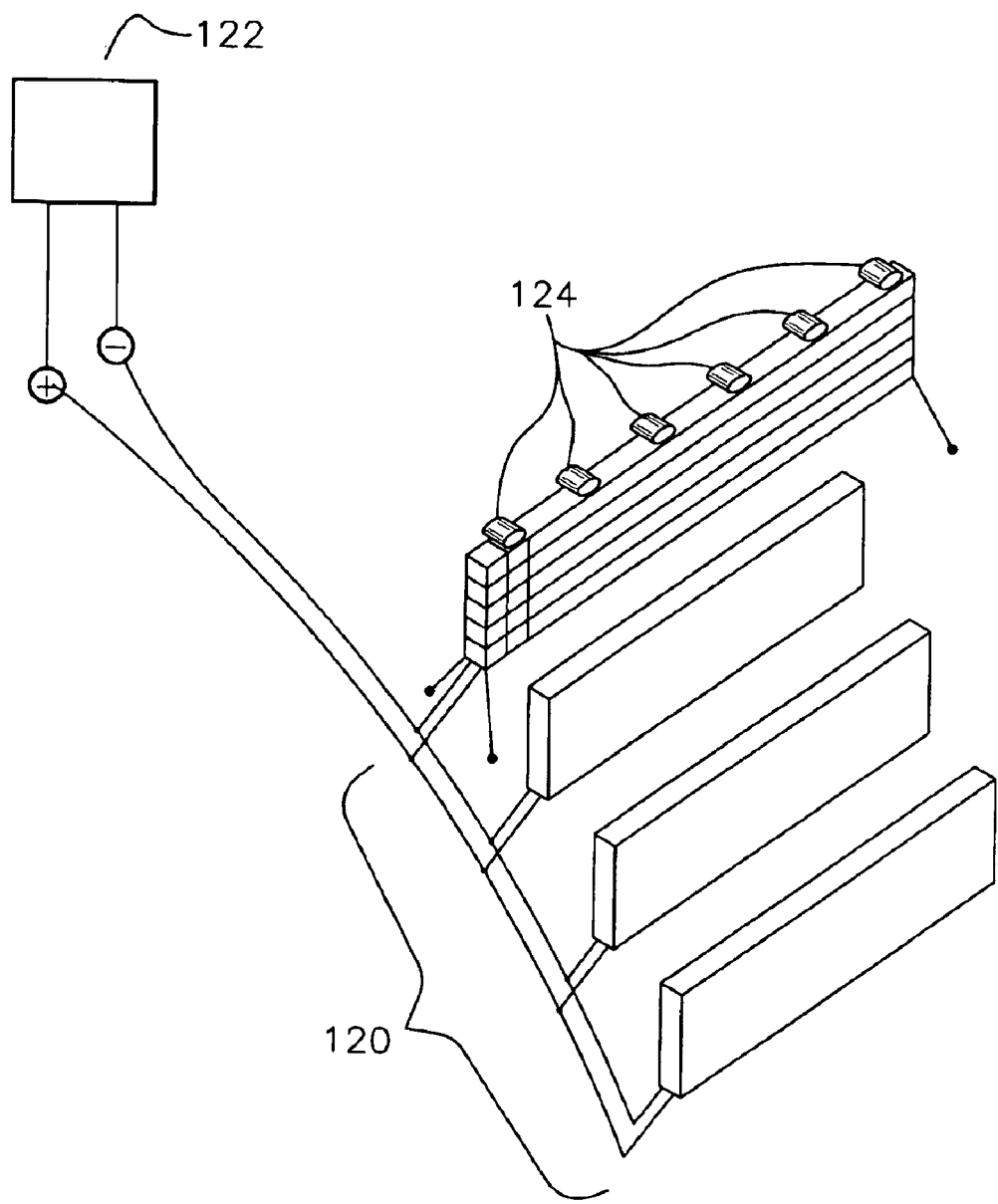
FIG. 12 show a group of arrays of power generating cells electrically connected to the grid.

FIG. 12 show a group of arrays 120 of power generating cells electrically connected to the grid 122. The arrays are aligned at right angles to the flow of ocean tide and are electrically connected in parallel. Floats 124 are provided at the top of the arrays for alignment, location and tracking purposes. In a preferred embodiment the arrays are located near the breakwater point to capture the maximum amount of energy near the shore.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention.

I claim:

1. A machine for power generation through movement of water comprising:

an array of power generating cells;

said array composed of said cells in an electrically interconnected modular arrangement;

said cells operate independently of each other within said array and are interchangeable with each other in a plurality of positions within said array;

said cells are positioned to receive kinetic energy from the movement of water, wherein said cells convert said energy by the movement of an electrical turbine within each cell.

2. A machine for power generation through movement of water as claimed in claim 1 wherein said turbine has displaced in its impeller magnetic polyme.

3. A machine for power generation as claimed in claim 1 wherein said cells produce less than 5000 watts individually.

4. A machine for power generation through movement of water as claimed in claim 1 wherein said cells are electrically interconnected to the electrical grid through a tray capable of holding a plurality of cells.

5. A machine for power generation through movement of water as claimed in claim 4 further comprising cells deployed in opposite orientations to receive movement of water from two directions.

6. A system for power generation through the movement of water comprising:

a plurality of energy cells individually producing less than 5000 Watts each;

a tray for holding said cells in electrical communication with one or more of said cells;

said cells arranged in vertically stacked arrays in the ocean and transverse to the ocean tidal movement;

said cells operate independently and are interchangeable with each other within said array; and wherein said arrays are electrically connected to the electrical grid.

7. A system for power generation through the movement of water as claimed in claim 6 wherein said arrays are moored to the ocean floor.

8. A system for power generation through the movement of water as claimed in claim 6 further comprising floats attached to said arrays to maintain a vertical alignment in the ocean.

9. A machine for power generation through movement of water comprising:

a housing having electrically conductive windings;

an impeller displaced within said housing having polymer magnetic elements that create induced electrical energy upon rotation of said impeller within said housing; and blades on said impeller for receiving kinetic energy from water wherein said impeller is motivated by the movement of water across said blades.

10. A machine for power generation through movement of water as claimed in claim 9 wherein said windings comprise electrically conductive polymer embedded within said housing.

11. A system for power generation through movement of water comprising:

a plurality of turbines having magnetic polymer displaced in an impeller of a said turbines;

said impellers surrounded by electrically conductive windings displaced in a housing about said impellers;

said turbines arrayed in a modular arrangement and electrically interconnected;

wherein said impellers are motivated by the movement of water to generate electricity.

12. A system for power generation through movement of water as claimed in claim 11 wherein said magnetic polymer is a polymer.

13. A system for power generation through movement of water as claimed in claim 11 wherein said impeller has a plurality of rotating blades in at least one stage.

14. A system for power generation through movement of water as claimed in claim 11 further comprising a transfer plate upon which said cells are electrically interconnected and through which transfer electrical power.

* * * * *

UNITED STATES PATENT AND TRADEMARK OFFICE
CERTIFICATE OF CORRECTION

PATENT NO. : 6,955,049 B2  Page 1 of 1
APPLICATION NO. : 10/851604
DATED : October 18, 2005
INVENTOR(S) : Wayne F. Krouse It is certified that error appears in the above-identified patent and that said Letters Patent is hereby corrected as shown below:

Column 6, lines 31-33 of the specification, applicant erroneously typed the following phrase:

"among them ferrous, ceramic, or magnetic polymer (magneto polymer rare earth magnets (NdFeB) types."

Please replace the above phrase with the below listed language:
"among them ferrous, ceramic, ~~or~~ magnetic polymer (magneto polymer) or rare earth magnets (NdFeB) types."

.

Column 6, lines 48-50 of the specification, applicant erroneously typed the following phrase:

"ocean: ferrous, ceramic, magnetic polymer (magneto polymer rare earth magnets (NdFeB) types."

Please replace the above phrase with the below listed language:
"ocean: ferrous, ceramic, magnetic polymer (magneto polymer) or rare earth magnets (NeFeB) types."

Signed and Sealed this

Second Day of December, 2008

JON W. DUDAS
*Director of the United States Patent and Trademark Office*

US006955049C1

(12) EX PARTE REEXAMINATION CERTIFICATE (7439th)
United States Patent
Krouse

(10) Number: US 6,955,049 C1
(45) Certificate Issued: Mar. 30, 2010

(54) MACHINE AND SYSTEM FOR POWER GENERATION THROUGH MOVEMENT OF WATER

(75) Inventor: Wayne F. Krouse, Houston, TX (US)

(73) Assignee: Hydrogreen Energy, LLC, Houston, TX (US)

Reexamination Request:
No. 90/009,342, Nov. 24, 2008

Reexamination Certificate for:
Patent No.: 6,955,049
Issued: Oct. 18, 2005
Appl. No.: 10/851,604
Filed: May 21, 2004

Certificate of Correction issued Dec. 2, 2008.

Related U.S. Application Data

(60) Provisional application No. 60/474,051, filed on May 29, 2003.

(51) Int. Cl.
F03B 13/00 (2006.01)
F03B 13/10 (2006.01)
F03B 13/12 (2006.01)
H02P 9/04 (2006.01)

(52) U.S. Cl. .................. 60/641.7; 290/43; 290/54; 415/3.1; 415/906; 415/7; 416/DIG. 4; 60/398

(58) Field of Classification Search .................. None
See application file for complete search history.

(56) References Cited

U.S. PATENT DOCUMENTS

| | | |
|---|---|---|
| 4,850,190 A | 7/1989 | Pitts |
| 5,440,176 A | 8/1995 | Haining |
| 5,876,610 A | 3/1999 | Clack et al. |
| 6,647,716 B2 | 11/2003 | Boyd |

*Primary Examiner*—William C Doerrler

(57) ABSTRACT

A machine and system for power generation through movement of water having an array of power generating cells electrically interconnected, where the array is configured in an interchangeable modular fashion and the cells are positioned to receive kinetic energy from the movement of water to generate electricity through the movement of an electrical turbine within each cell. The individual turbines and cells may generate relatively small amounts of electricity and use polymer magnetics in the impellers and windings in the turbine to withstand ocean environments and are stacked on electrically conductive trays for ease of installation and replacement.

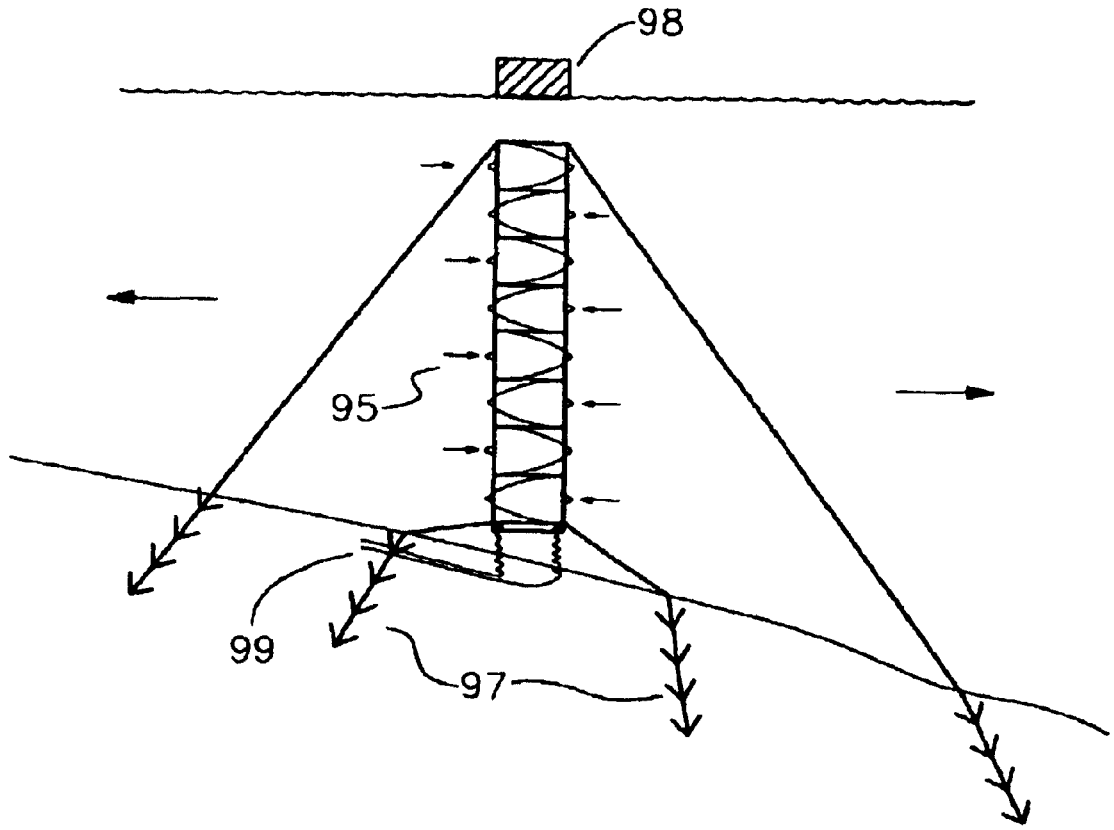

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6–8 is confirmed.

Claims 1–3, 5, 9–12 and 14 are determined to be patentable as amended.

Claims 4 and 13, dependent on an amended claim, are determined to be patentable.

1. A machine for power generation through movement of water comprising:
    [an] *a generally contiguous* array of power generating cells; said array composed of said cells in an electrically interconnected [modular] arrangement;
    said cells operate independently of each other within said array and are interchangeable with each other in a plurality of positions within said array;
    said cells are positioned to receive kinetic energy from the movement of water, wherein said cells convert said energy by the movement of an electrical turbine within each cell.

2. A machine for power generation through movement of water as claimed in claim 1 wherein said turbine has displaced in its impeller magnetic [polyme] *polymer*.

3. A machine for power generation as claimed in claim 1 wherein said cells [produce less than 5000 watts individually] *are stacked vertically*.

5. A machine for power generation through movement of water as claimed in claim 4 [further comprising cells deployed in opposite orientations to receive movement of water from two directions] *wherein said cells are stacked horizontally*.

9. A machine for power generation through movement of water comprising:
    a housing having electrically conductive windings;
    an impeller displaced within said housing having [polymer magentic elements] *magneto polymer* that [create] *creates* induced electrical energy upon rotation of said impeller within said housing;
    and blades on said impeller for receiving kinetic energy from water wherein said impeller is motivated by the movement of water across said blades.

10. [A machine for power generation through movement of water as claimed in claim 9] *A machine for power generation through movement of water comprising:*
    *a housing having electrically conductive windings;*
    *an impeller displaced within said housing having polymer magnetic elements that create induced electrical energy upon rotation of said impeller within said housing;*
    *and blades on said impeller for receiving kinetic energy from water wherein said impeller is motivated by the movement of water across said blades* wherein said windings comprise electrically conductive polymer embedded within said housing.

11. A system for power generation through movement of water comprising:
    a plurality of turbines having [magnetic polymer] *magneto polymer* displaced in an impeller of a said turbines;
    said impellers surrounded by electrically conductive windings displaced in a housing about said impellers;
    said turbines arrayed in a modular arrangement and electrically interconnected;
    wherein said impellers are motivated by the movement of water to generate electricity.

12. A system for power generation through movement of water as claimed on claim 11 wherein said [magnetic polymer is a polymer] *windings are electrically conductive polymer*.

14. [A system for power generation through movement of water as claimed in claim 11] *A system for power generation through movement of water comprising:*
    *a plurality of turbines having magnetic polymer displaced in an impeller of a said turbines;*
    *said impellers surrounded by electrically conductive windings displaced in a housing about said impellers;*
    *said turbines arrayed in a modular arrangement and electrically interconnected;*
    *wherein said impellers are motivated by the movement of water to generate electricity* further comprising a transfer plate upon which said cells are electrically interconnected and through which transfer electrical power.

* * * * *